United States Patent
Taniguchi et al.

(10) Patent No.: US 8,044,596 B2
(45) Date of Patent: Oct. 25, 2011

(54) ELECTRON EMISSIVE ELEMENT AND DISPLAY ELEMENT

(75) Inventors: Masateru Taniguchi, Chiba (JP); Takahiro Niiyama, Chiba (JP); Shigeo Itoh, Chiba (JP); Kazuhito Nakamura, Chiba (JP); Kenta Miya, Chiba (JP); Masakazu Namba, Tokyo (JP); Yuki Honda, Tokyo (JP); Toshihisa Watabe, Tokyo (JP); Norifumi Egami, Tokyo (JP)

(73) Assignees: Futaba Corporation, Mobara-shi, Chiba (JP); NHK Science & Technical Research Laboratories, Setagaya-ku, Tokyo (JP)

(*) Notice: Subject to any disclaimer, the term of this patent is extended or adjusted under 35 U.S.C. 154(b) by 444 days.

(21) Appl. No.: 12/252,359

(22) Filed: Oct. 15, 2008

(65) Prior Publication Data
US 2009/0096393 A1    Apr. 16, 2009

(30) Foreign Application Priority Data
Oct. 16, 2007 (JP) .................................. 2007-269251

(51) Int. Cl.
G09G 3/10 (2006.01)
H05B 37/00 (2006.01)
H05B 39/00 (2006.01)
H05B 41/00 (2006.01)

(52) U.S. Cl. ............... 315/169.1; 315/169.2; 315/169.3; 315/320; 315/321; 315/312; 315/313; 315/314; 315/315

(58) Field of Classification Search .... 315/169.1–169.3, 315/320–321; 316/312–315
See application file for complete search history.

(56) References Cited

U.S. PATENT DOCUMENTS

| | | | | |
|---|---|---|---|---|
| 5,500,572 | A | * | 3/1996 | Anagnostopoulos et al. ......................... 315/169.1 |
| 5,536,993 | A | * | 7/1996 | Taylor et al. .................. 313/336 |
| 5,557,159 | A | * | 9/1996 | Taylor et al. .................. 313/336 |
| 5,818,500 | A | * | 10/1998 | Edwards et al. ............... 347/238 |
| 6,252,569 | B1 | * | 6/2001 | Hodson et al. ............... 345/75.2 |

FOREIGN PATENT DOCUMENTS

| | | | |
|---|---|---|---|
| JP | 04-077278 | * | 2/1994 |
| JP | 06-044927 A | | 2/1994 |
| JP | 06044927 A | * | 2/1994 |
| JP | 06111735 A | * | 4/1994 |
| JP | 07073800 A | * | 3/1995 |

* cited by examiner

*Primary Examiner* — Shawki S Ismail
*Assistant Examiner* — Matthew C. Tabler
(74) *Attorney, Agent, or Firm* — Quarles & Brady LLP (57) ABSTRACT

Electron-emissive drive units of electron-emissive elements capable of being arranged with a smaller pitch. FET and emitter array units exist in matrix element areas partitioned by a control wiring and data wiring. An exemplary unit is composed of four emitter arrays. The control wiring and data wiring are driven by first and second drive circuits, respectively. Corresponding arrays between units are connected by selection wiring and driven by a third drive circuit. The third drive circuit drives each unit of data wiring every time the drive circuit sequentially drives the four units of control wiring, and the emitter array drive circuit drives each emitter array selection wiring every time the drive circuit sequentially drives the three units of data wiring. Electrons can be emitted in units of arrays smaller than the unit.

5 Claims, 8 Drawing Sheets

ELECTRON EMISSIVE ELEMENT AND DISPLAY ELEMENT

CROSS REFERENCES TO RELATED APPLICATIONS

This application claims the priority benefit of Japanese Patent Application No. 2007-269251 filed on Oct. 16, 2007, which is fully incorporated herein by reference.

STATEMENT REGARDING FEDERALLY SPONSORED RESEARCH

Not applicable.

BACKGROUND OF THE INVENTION

1. Field of the Invention

The present invention relates to field emission election-emissive elements arranged in a matrix form, and to a display element employing such electron-emissive elements as the electron source for discharging the emission of light by irradiating electrons with a fluorescent material. More particularly, the present invention relates to an electron-emissive element in which the pitch of electron-emissive unit areas is minimized in structures and the electron-emissive unit areas and switching elements for selectively driving the same are stacked, and also to a display element minimizing the pixel pitch of the display area as a result of the use of such an electron-emissive element as the electron source.

2. Description of the Related Art

Japanese Patent Application Laid-open Publication No. H6-44927 discloses a field emission cathode (FEC), which is capable of static drive, with a high display density and good properties in circuits built with FECs. The structure comprises a plurality of control wirings and data wirings forming a matrix on a monocrystalline silicon (Si) substrate. As a result, there is formed a plurality of element areas in which the elect-on-emissive elements are arranged. In each element area, a circuit element is formed on a crystalline Si substrate, and a field emission element is formed as a drive unit area thereon. The circuit element has a transistor that is a switching element in which the drain is connected to the data wiring and the gate is connected to the control wiring, a capacitor that is a memory circuit for input signals, and a transistor that amplifies and applies the input signals to the field emission part. This results in good properties in the circuit elements built on monocrystalline Si substrates, and the density is higher because the field emission part is stacked on top. It is also held that static drive is possible because the circuit element has a capacitor.

Figure 9A:
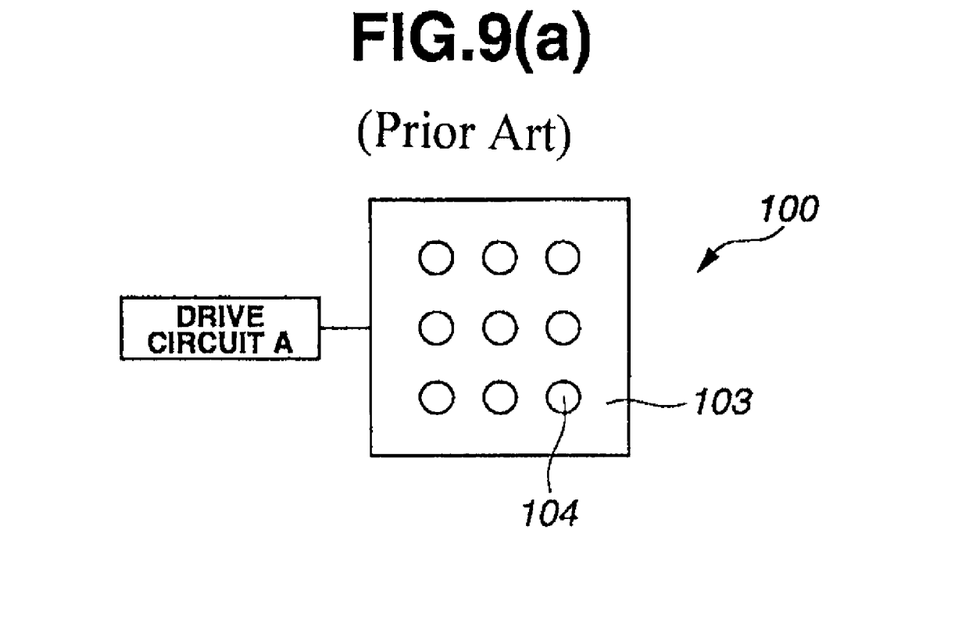
FIGS. 9(a)-(b) are explanatory views of a field emission cathode of a matrix structure, showing the structure of the field emission part and its circuitry in the element areas.
Figure 9B:
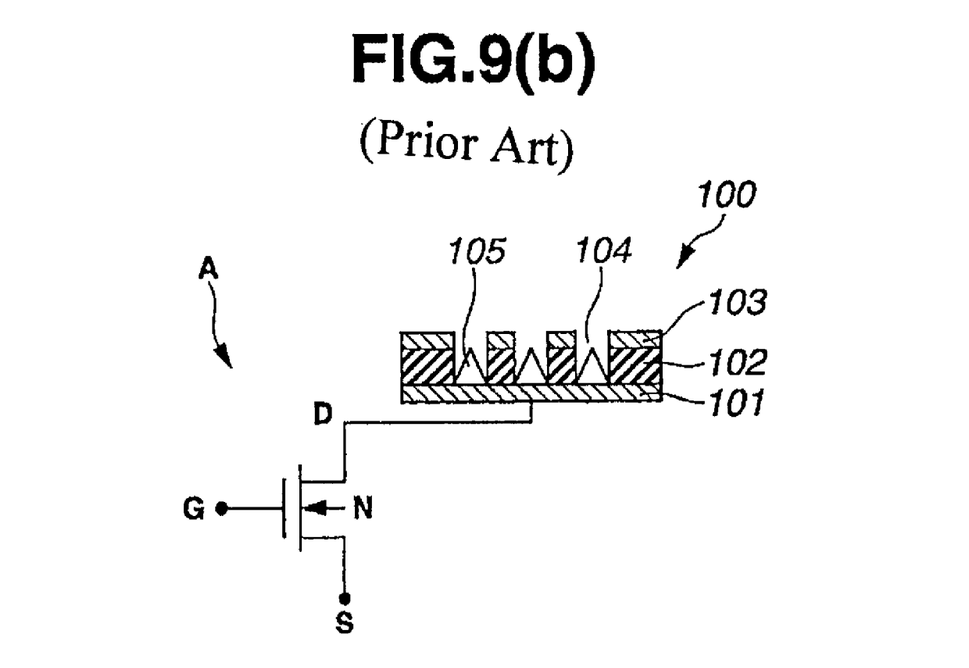

In the field emission cathode having the matrix structure disclosed in the above referenced related application, circuit elements are provided to selectively drive the field emission elements formed in each of the element areas of the matrix as described above. FIGS. 9(a) and (b) show the structure of the circuitry and field emission components of the element areas in the field emission cathode having such a matrix structure. FIG. 9(a) is an elevational view and FIG. 9(b) is a schematic cross section and circuit diagram.

A drive circuit A shown in FIGS. 9(a) and (b) is formed on a monocrystalline substrate of silicon or the like, and has an N-channel field-effect transistor (FET) as a switching element connected to a matrix wiring (not shown) arranged on the same monocrystalline substrate. The FET source S is connected to a data wiring (not shown), the gate G is connected to a control wiring (not shown), and the drain D is connected to an underlay electrode 101 of the field emission part 100 described below.

The field emission part 100 shown in FIGS. 9(a) and (b) is formed by being stacked on a corresponding drive circuit A, with an insulation layer in between. That is, the underlay electrode 101 is formed on an insulation layer (not shown) covering the drive circuit A, and an insulation layer 102 such as silicon dioxide ($SiO_2$), silicon nitride ($Si_3N_4$), aluminum oxide ($Al_2O_3$), or the like is formed on the underlay electrode 101. Furthermore, a gate electrode 103 such as a niobium (Nb) layer is formed on the insulation layer 102. Holes 104 are formed in the gate electrode 103 and insulation layer 102, and conical emitters 105 consisting of molybdenum (Mo) (or titanium (Ti), tungsten (W), etc.) are formed on the underlay electrode 101 exposed in the holes 104. The drain of the FET is connected to the underlay electrode 101 of the field emission part 100.

In the field emission part 100 having such a drive circuit A, when the gate G of the FET in the drive circuit A is ON, data signals of a predetermined potential are applied to the emitter 105, and electrons are emitted. When the gate G is OFF, the emitter 105 is not connected to any specific potential, i.e., floating. The potential therefore gradually increases, ultimately, from the data signal potential such as 0 (V) to Vg-Vth (V) wherein Vg is the gate voltage, and Vth is the inherent emission threshold voltage of the emitter. Upon reaching the threshold voltage Vg-Vth, the electron emission from the emitter 105 stops.

Thus, because electrons continue to be emitted from the emitter 105 in the time it takes for the potential to increase from 0 (V) to Vg-Vth (V), unnecessary light leakage occurs in a display area which emits light through electron bombardment using display elements in which the electron source is the field emission part 100 exhibiting such electron emission behavior.

Figure 10:
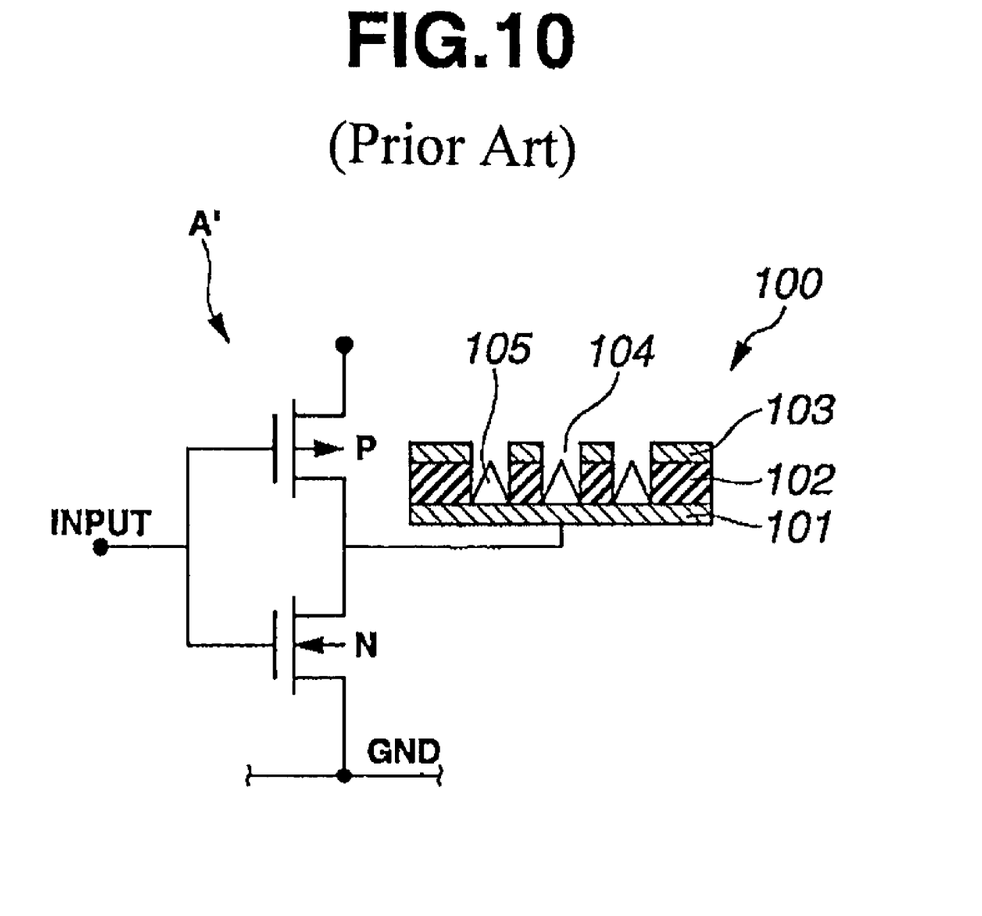
FIG. 10 is an explanatory view of a field emission cathode showing the element area in cross section together with a modified circuit emission part in the element areas of a field emission type cathode of a matrix structure, and a circuit diagram of the modified circuit.

It is known that the output stage of a transistor can be structurally made into a drive circuit A' with a complementary structure (C-MOS), as shown in FIG. 10, to overcome such problems through circuitry. When the input in this drive circuit A' is low, the p-channel FET is turned ON, resulting in an emitter 105 potential of Vg-Vth (V). When the input is high, the N-channel FET is turned ON, resulting in an emitter 105 potential of GND. In either case, the emitter 105 potential is not floating. In circuits with this type of C-MOS structure, the P-type FET may also be replaced with a resistor. For static drive, a memory function may be introduced with the addition of a capacitor to the drive circuit.

However, attempts to solve existing problems through these types of structural circuit modifications result in a number of new problems. For example, when such electron-emissive elements are used as an electron source in display elements, the field emission part of the element areas in the display elements arranged in a matrix correspond to the pixels of the display part, but the field emission part arrangement pitch which determines the pixel pitch is governed by the size of the circuit elements. In other words, the pixel pitch can be made smaller by constructing smaller circuit elements in the element areas, but the circuit elements are actually quite large in structures capable of solving the floating problem described above while satisfactorily meeting the withstand voltage performance required of the circuit elements. For example, a FET with 40 V withstand voltage is about 15 μm square, and the C-MOS structure with two FETs described above cannot be made when the required pixel pitch (about 20 μm, for example) is taken into consideration. This is also true even if one of the two FETs is replaced with a resistor. Adding a capacitor to the drive circuit A' will result in even larger circuit elements.

SUMMARY OF THE INVENTION

A first embodiment of the present invention, intended to overcome such problems in the prior art, is matrix electron-emissive elements comprising stacked circuit elements and electron-emissive parts capable of minimizing the pitch of the unit areas of electron-emissive parts that are driving units without the circuit elements being limited by the size needed to meet the necessary withstand voltage capacity. A second embodiment of the present invention is a display element in which such electron-emissive elements are used as the election source to achieve maximum pixel pitch resolution in display parts.

One electron-emissive element in accordance with an aspect of the present invention comprises a matrix wiring including first and second wirings which define a plurality of element areas in a matrix and to which predetermined potentials are applied, respectively. Switching circuits are provided in each element area which include switching elements connected to the matrix wiring. The electron-emissive element further includes emitter array units that are stacked on the switching circuits in each element area and are connected to the switching circuits. The emitter array unit comprises a plurality of arranged emitter arrays having a plurality of microtip emitters for emitting electrons and a gate electrode for extracting the electrons from the microtip emitters. Furthermore, the electron-emissive element includes an emitter array drive circuit for driving the emitter array unit for each emitter array provided at the corresponding locations in each emitter array unit, wherein the switching elements are driven by the matrix wiring to select the emitter array units, and the emitter arrays in the selected emitter array units are selected by the emitter array drive circuits. Similarly, the gate electrodes of the emitter arrays provided at the corresponding locations in each emitter array unit are connected in common by a plurality of emitter array selection wirings, and the emitter array drive circuit drives the plurality of emitter array selection wirings.

Another electron-emissive element in accordance with an aspect of the present invention is provided with a switching electrode in each emitter array unit. The switching electrodes corresponding to each of the emitter array unit are connected in common by the plurality of emitter array selection wirings, and the emitter array drive circuit drives the plurality of emitter array selection wirings.

The control terminals of the switching elements are connected by a control wiring which is the first wiring of the matrix wiring, one of the input terminal and output terminal of each switching element is connected to the emitter array unit, and the other of the input terminal and output terminal of each switching element is connected to a common fixed potential which is the second wiring of the matrix wiring. A first drive circuit for serially transmitting data is connected to the control wiring, a second drive circuit for applying a predetermined potential to the other of the input terminal and output terminal of each switching circuit is connected to the fixed potential, and control signals are applied to the control terminal of each switching element during one drive cycle to select the emitter array units, and the emitter arrays in the drive cycle are selected by the emitter array drive circuit.

A display element in accordance with an aspect of the present invention comprises a matrix wiring having first and second wirings which define a plurality of element areas in a matrix and are driven at a predetermined potential. Switching circuits are provided in each element area which includes switching elements connected to the matrix wiring. The display element further includes emitter array units that are stacked on the switching circuits in each element area and connected to the switching circuits. The emitter array units comprises a plurality of emitter arrays having a plurality of microtip emitters for emitting electrons and a gate electrode for extracting the electrons from the microtip emitters. Furthermore, the display element includes an emitter array drive circuit for driving the emitter array unit for each emitter array provided at the corresponding location in each emitter array unit, and anodes disposed opposite to the emitter array units having a certain distance from the emitter array units. The anode is coated with a fluorescent material that emits light upon being bombarded with electrons emitted from the emitters. The switching elements are driven by the matrix wiring to select the emitter array units, the emitter arrays in the selected emitter array units are selected by the emitter array drive circuit, and the electrons emitted from the emitters in the selected emitter arrays bombard the fluorescent material of the anode, thereby emitting light.

An electron-emissive element according to an aspect of the present invention comprises switching circuits and emitter array units stacked in each of the element areas of the matrix. The switching elements are driven by the matrix wiring forming the matrix to select the desired emitter array units. Furthermore, the emitter arrays in the selected emitter array units are selected, allowing electrons to be emitted using units of emitter arrays that are smaller than the emitter array units. In this way, matrix electron-emissive elements can be fabricated using a stacked structure, without being limited by size, while also meeting the withstand voltage performance required of switching elements such as FET. Furthermore, electron-emissive elements formed with a sufficiently small pitch can be used in the selected drive units, so that when they are used as the electron source in display elements, the pitch of the pixels which are the display units arranged in the display areas can be made sufficiently small enough to increase the display resolution.

The gate electrodes of emitter arrays provided at the corresponding locations in each emitter array unit are connected in common by a plurality of emitter array selection wirings, and the plurality of emitter array selection wiring systems are driven by the emitter array drive circuit to select emitter arrays in the emitter array units, thus allowing electron-emissive areas to be selected and driven in units of emitter arrays. In the electron-emissive element of the present invention the switching electrode is provided in each emitter array unit. The switching electrodes provided at the corresponding location of each emitter array unit are connected in common by the plurality of emitter array selection wirings. The plurality of emitter array selection wirings are driven by the emitter array drive circuit, thus allowing electron-emissive areas to be selected and driven in units of emitter arrays.

According to one embodiment of the present invention, a first drive circuit inputs control signals to the control terminals of each of the switching elements while the second drive circuit applies a predetermined potential to the other of the input terminal and output terminal of the switching elements, so that the emitter array units are selected, and emitter arrays driven at the same time can be selected from among the emitter array units by the emitter array drive circuit. The duty ratio while the units are driven can thus be greater than when emitter arrays are selected in a matrix having a common structure of the type where the matrix is formed by first and second wiring in the order of several hundred units each. The light-emitting time is also longer when the above are used as electron sources in display elements, resulting in better brightness.

The switching circuits and emitter array units are slacked in each of the element areas of the matrix, the switching elements are driven by the matrix wiring forming the matrix to select the desired emitter array units, and the emitter arrays in the selected emitter array units are selected, allowing electron-emissive areas to be selected and driven in units of emitter arrays that are smaller than the emitter array units. Thus, when the switching elements are driven by the matrix wiring to select emitter array units, and the emitter arrays in the selected emitter array units are selected by the emitter array drive circuit, the electrons emitted from the emitters in the selected emitter arrays bombard the fluorescent material deposited anodes to produce light, allowing anodes to be selected for light emission in pixel units arranged in the form of a matrix to bring about the desired display.

In this way, the matrix electron-emissive elements can be fabricated using a stacked structure, without being limited by size, while also meeting the withstand voltage performance required of switching elements such as FETs. Furthermore, the electron-emissive elements formed with a sufficiently small pitch can be used in the selected drive units, so that the pitch of the pixels which are the display units arranged in the display areas can be made small enough to increase the display resolution.

Other aspects and advantages of the invention will be apparent from the following description. In the description, reference is made to the accompanying drawings which form a part thereof, and in which there is shown by way of illustration a preferred embodiment of the invention.

DESCRIPTION OF THE PREFERRED EMBODIMENTS

The invention will be explained by referring to the attached drawings. First, the basic structure of an electron-emissive element 1 according to the first embodiment of the present invention will be explained with reference to FIGS. 1 to 4. The electron-emissive element 1 shown in FIG. 1 has a matrix wiring. The matrix wiring is composed of control wirings 2, which are a plurality of first wirings disposed at a certain interval, and data wirings 3, which are a plurality of second wirings disposed at a certain interval intersecting the control wirings. The intersections of the wirings result in a structure comprising a plurality of element areas 4 arranged in a matrix.

Figure 1:
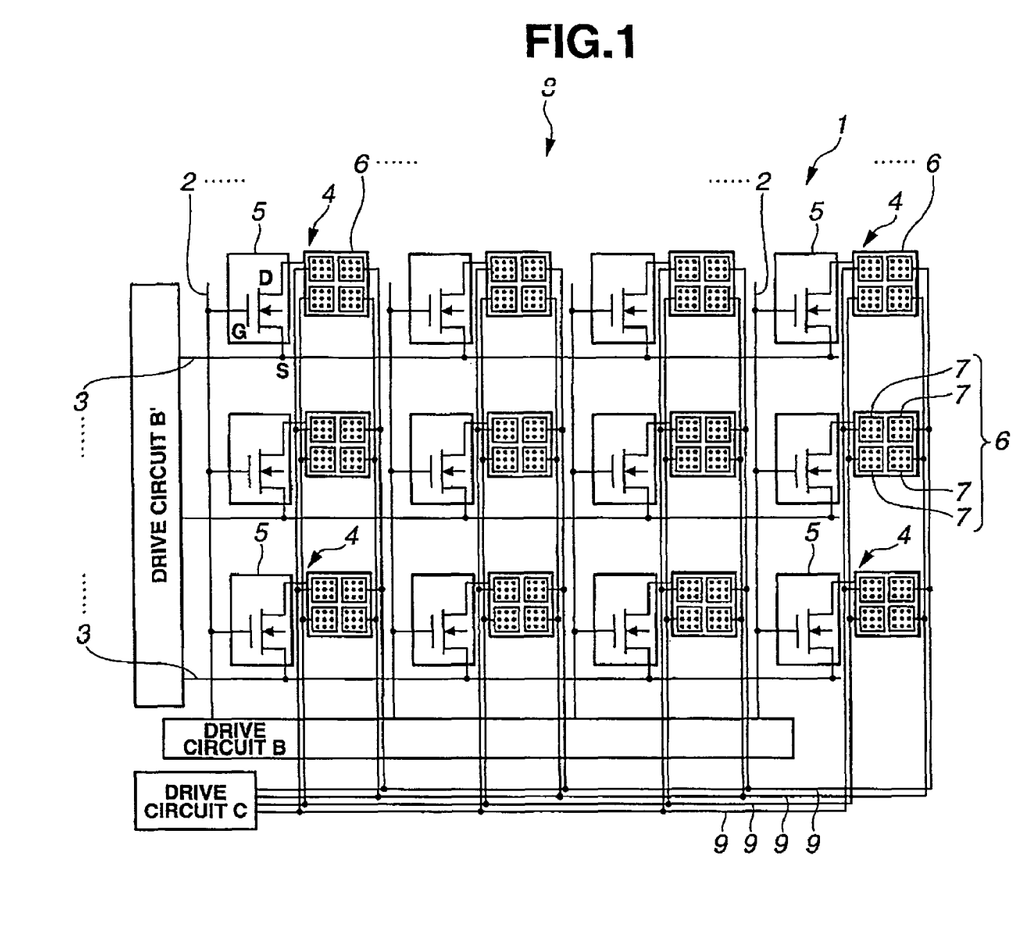
FIG. 1 is a plan view of the basic structure of an embodiment of a field electron-emissive element according to an aspect of the present invention.

In FIG. 1, there are four units of control wiring 2, and three units of data wiring 3, resulting in twelve element areas 4, but this is merely for the convenience of explanation and illustration. When used as an electron source for a display element, the number of wirings is usually greater, as is the number of element areas 4. More specifically, bands of the control wirings 2 are arranged at a certain interval in the X direction via insulation layers (not shown) on a monocrystalline substrate (referred to simply as "substrate" below) such as silicon (not shown). Bands of the data wiring 3 are arranged at a certain interval in the Y direction via insulation layers (not shown) on the control wirings 2, thereby forming the matrix wiring. The control wirings 2 and data wirings 3 are both composed of a thin aluminum (Al) film or the like.

A first drive circuit B is connected to the control wirings 2, and predetermined control signals are applied at a desired timing to the control wirings 2. A second drive circuit B' is connected to the data wirings 3, and predetermined data signals are applied at a desired timing to the data wirings 3.

The element areas 4 separated by the matrix wiring are provided with a FET 5 forming switching circuits connected to the matrix wiring, and emitter array units 6 formed by being stacked on the FET 5 in each element area 4 and connected to the FET 5. In FIG. 1, each emitter array unit 6 and corresponding FET 5 are shown as being provided in separate locations for the convenience of illustration, but in the actual structure, both are stacked in one element area 4.

Next, the switching circuit in the lower layer of the element area 4 will be explained. The switching circuits provided in each emitter array unit 6 are composed of a FET 5 as a switching element. The FET 5 shown in FIG. 1 is a MOS type N-channel field effect transistors built on a substrate. The source S of the FET 5, which is on the input side, is connected to the data wiring 3, and the gate G is connected to the control wiring 2. The drain D, which is on the output side of the FET 5, is connected to the underlay electrode of the emitter array unit 6 described below. The drain D and sources S of the FET 5 are n+ layers formed on the substrate, and the gate G can be formed with polysilicon or a high melting point metal, such as a metal silicide.

Reference is now made to the emitter array unit 6 serving as an electron-emissive part on the upper layer of the element area 4. The field emission electron-emissive part is formed in each element area 4 as described above and is stacked via insulation layers on the matrix wiring including the control wiring 2 and the data wiring 3 and the FET switching circuit 5.

Although the structure of the emitter array unit 6 is not shown in detail in FIG. 1, an underlay electrode is provided on the insulation layer, and an insulation layer of $SiO_2$, $Si_3N_4$, $Al_2O_3$, or the like is formed thereon. Furthermore, a gate such as an Nb layer is formed on that insulation layer. Holes are formed in the gate and insulation layer, and conical emitters consisting of Mo, Ti, W, or the like, are formed on the underlay electrode exposed through the holes. The basic structure having an underlay electrode, emitters, and gate Ls generally the same as that shown in FIG. 10.

Figure 2A:
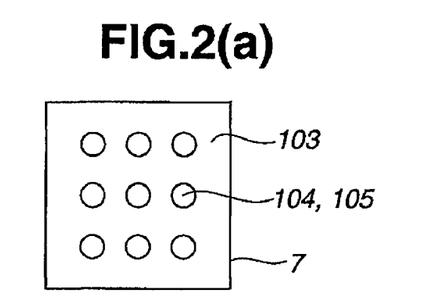
FIGS. 2(a)-(c) are explanatory views showing structure and constituent elements of the electron-emissive element of FIG. 1.

The smallest structural parts of the electron-emissive unit 6 are conical microtip emitters. Electrons are emitted from the tips by means of the gate electrode provided adjacent to the emitters. In this example, a plurality of the microtip emitters, shown in FIGS. 1 and 2(*a*), are referred to as emitter arrays 7. This is the smallest electronic element in terms of selecting electron emission, and corresponds to pixels in a display area when used as an electron source in display elements. In the embodiment shown in FIGS. 1 and 2(*a*), one emitter array 7 is formed of a total of nine (9) microtip emitters 105 (three rows of three) and a common gate electrode 103.

Figure 2B:
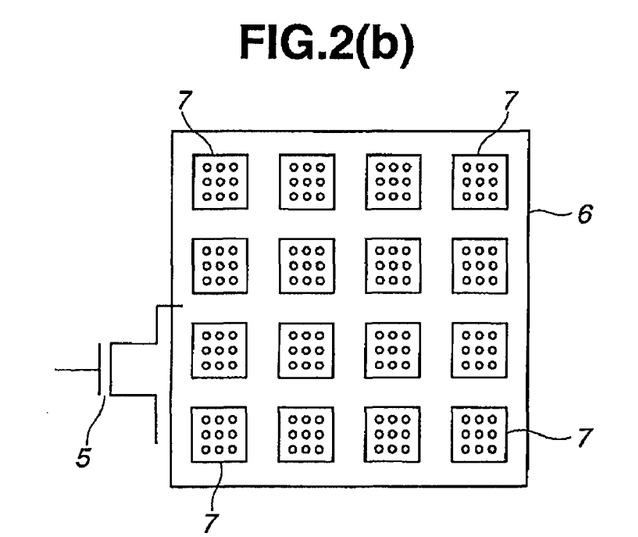

Each of the plurality of emitter arrays 7 are collectively referred to as emitter array units 6. This is the unit for selecting an area capable of electron emission by the FET switching circuit 5. In FIG. 1, one emitter array unit 6 is formed of a total of four emitter arrays 7 (two rows of two), but in FIG. 2(*b*), one emitter array unit 6 is formed of a total of sixteen emitter arrays 7 (four rows of four).

Figure 2C:
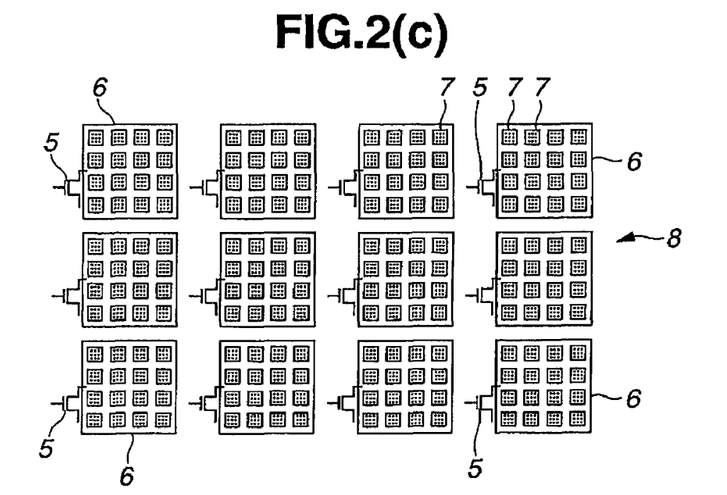

As further shown in FIGS. 1 and 2(*c*), the plurality of emitter array units 6 are referred to as an emitter array group 8. This forms the entire aggregate of the microtip emitters in the plurality of element areas 4 corresponding to the entire electron-emissive surface arranged in the form of a matrix. In FIGS. 1 and 2(*c*), the emitter array group 8 is formed of twelve emitter array units 6 arranged in three rows and four columns, but this is only for the convenience of illustration. The number of emitter array units 6 forming the emitter array group 8 may be more or less.

FIGS. 1 and 2(*c*) show large intervals between adjacent emitter array units 6 such that the interval between adjacent emitter arrays 7 across adjacent emitter array units 6 appears greater than the interval between adjacent emitter arrays 7 within the same emitter array unit 6. However, the interval between adjacent emitter arrays 7 across adjacent emitter array units 6 is actually equal to the interval between adjacent emitter arrays 7 within the same emitter array unit 6.

The electron-emissive element 1 shown in FIG. 1 is provided with a driving means configured to drive the matrix wiring (i.e., control wiring 2 and data wiring 3) by the first and second drive circuits B and B' to select the element array units 6. The driving means drive the emitter array units 6 for each emitter array 7 to be able to select the emitter arrays 7 in the selected element array units 6 as explained below.

As shown in FIGS. 1 and 2(*a*), the gate electrodes 103 for the emitter arrays 7 located in each emitter array unit 6 are connected to a common emitter array selection wiring 9. In the electron-emissive element 1 shown in FIG. 1, there are four emitter arrays 7 in each emitter array unit 6, and thus, there are four emitter array selection wirings 9. These emitter array selection wirings 9 are connected to a third drive circuit C, an emitter array drive circuit. The desired emitter arrays 7 are selected when the four emitter array selection wirings 9 are driven by the emitter array drive circuit C. This is done in synchronization with the selection of the emitter array units 6, accomplished by the FET switching elements 5 being driven by the first and second drive circuits B and B'.

Figure 3:
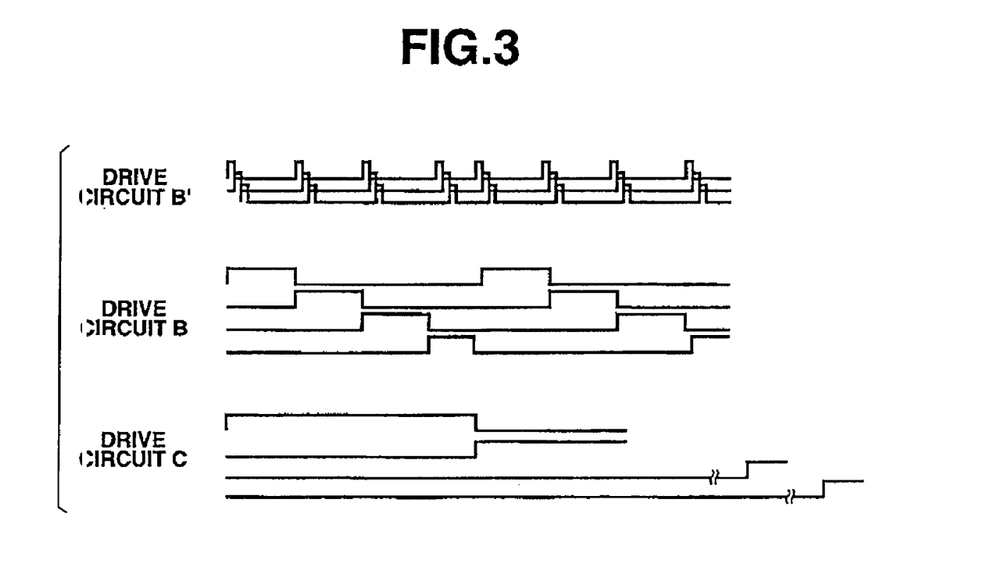
FIG. 3 is a drive timing chart for the electron-emissive element of FIG. 1.

A first driving pattern of the electron-emissive element according to the present invention will be described with reference to FIG. 3. FIG. 3 shows a drive timing chart for when all emitter arrays 7 are driver in one drive cycle through the emission of elections from only one emitter array 7 at a time. In this driving method, the first drive circuit B drives the gates G of the FET 5 of each switching circuit, and the four control wirings 2 are thus driven in sequence. Three emitter array units 6 are connected to each control wiring 2. The second drive circuit B' inputs data to the source S of the FET 5, and the three sets of data wiring 3 are thus driven in sequence. The first drive circuit B sequentially drives the four units of control wiring 2 per sequential drive cycle of the three units of data wiring 3 driven by the second drive circuit B'. The emitter array drive circuit C sequentially drives the four emitter array selection wirings 9 per sequential drive cycle of the four units of control wiring 2 driven by the first drive circuit B.

In FIG. 3, the rectangular waves directed to the control wiring 2 by the first drive circuit B are not "H," which means "ON." In this embodiment, N-channel FETs 5 are used, but "L" can mean "ON" depending on the type of transistors that are used. Here, the signal voltage input to the data wiring 3 can be altered so as to change the potential of the emitters 105 and change the level of electron emission in the field emission area. Thus, gradation display can be achieved when it is used in a display device. The drive waveforms of the first and second drive circuits B and B' as well as the emitter array drive circuit C shown in FIG. 3, reshuffled in any combination thereof, will drive the field-emissive element having electrons emitted from only one emitter array 7 at a time in the same manner as the embodiment shown in FIG. 3. In addition to the signal voltage input to the data wiring 3, the voltage applied to the control wiring 2 may be changed, and the potential of the emitters 105 may be altered to change the level of electron emission in field emission areas. The switching elements explained hereinabove include such a function.

Figure 4:
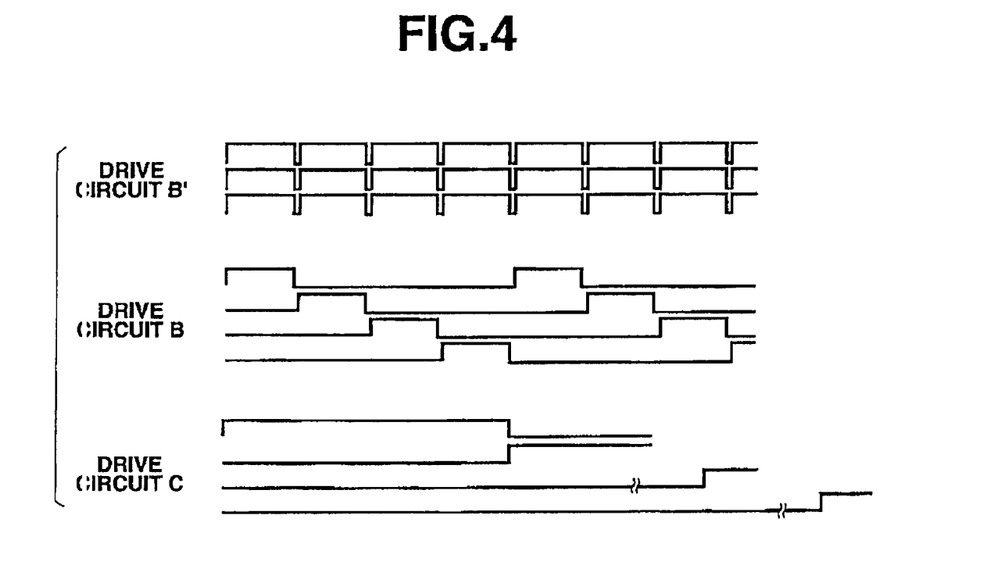
FIG. 4 is another drive timing chart for the electron-emissive element of FIG. 1.

A second drive pattern of the electron-emissive element according to the present invention will be described with reference to FIG. 4. FIG. 4 shows a drive timing chart for when all emitter arrays 7 are driven in one drive cycle through the emission of electrons from an emitter array 7 of one corresponding line at a time in the electron-emissive element shown in FIG. 1. In the driving method shown in FIG. 4, the first drive circuit B drives the gate G of the FET 5 of each switching circuit, and the four control wiring-units 2 are thus driven in sequence. Three emitter array units 6 are connected to each control wiring unit 2. The second drive circuit B' inputs ON and OFF signals to the three units of data wiring 3 every time each of the four units of control wiring 2 is turned ON. FIG. 4 illustrates when all signals are ON. The emitter array drive circuit C sequentially drives the four emitter array selection wiring systems 9 per the sequential drive cycle of the four units of control wiring 2. The signal voltage input to the data wiring 3 can be altered so as to change the potential of the emitters 105 and change the level of electron emission in the field emission area. Thus, gradation display can be achieved when it is use in a display device.

In FIG. 4, the rectangular waves directed to the control wiring 2 by the first drive circuit B are not "H", which means "ON." In this embodiment, N-channel FETs 5 are used and "L" can mean "ON" depending on the type of transistors that are used. The drive waveforms of the first and second drive circuits B and B' as well as the emitter array drive circuit C in FIG. 4, reshuffled in any combination thereof, can drive all emitter arrays 7 in a drive cycle through the emission of elections from the emitter arrays 7 of the corresponding line one at a time in the same manner as the embodiment shown in FIG. 3. In addition to the signal voltage input to the data wiring 3, the voltage applied to the control wiring 2 may be changed, and the potential of the emitters 105 may be altered to change the level of election emission in field emission area.

Figure 5:
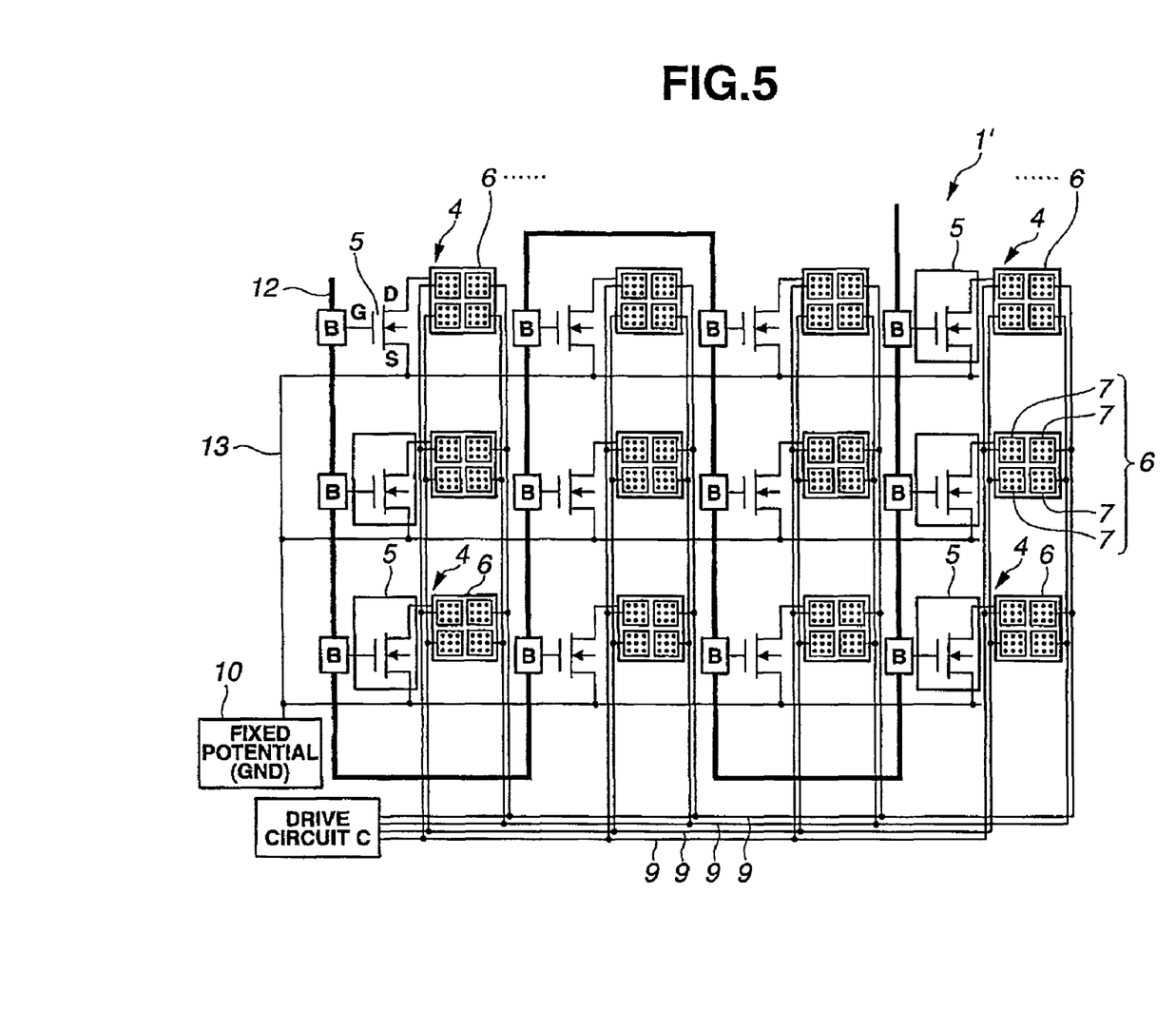
FIG. 5 is a plan view of the basic structure of another embodiment of an electron-emissive element according to another aspect of the present invention.

The basic structure of the electron-emissive element 1' according to the second embodiment will be explained with reference to FIG. 5. The electron-emissive element 1' in this embodiment has a different matrix wiring configuration from that in the first embodiment. The matrix wiring has a first control wiring 12 that is disposed in a bent shape and is connected to the gates G (i.e., the control terminals of the FET switching elements 5). The element 1' also has a common second data wiring 13 that is disposed at predetermined intervals so as to perpendicularly intersect the control wiring 12 and is connected to the sources S (i.e., either the input or output terminals of the FET switching elements 5). The intersections of the control wiring 12 and data wiring 13 result in a structure in which a plurality of element areas 4 are arranged in the form of a matrix. In FIG. 5, there are twelve matrix element areas 4 formed by the control wiring 12 and the data wiring 13, but this is for the convenience of illustration. When used as electron sources for display elements, the number of control wirings 12 and data wirings 13 is usually greater, as is the number of element areas 4.

Similar to the first embodiment, in FIG. 5, and for the convenience of illustration, one emitter array unit 6 and the FET 5 serving as the corresponding switching circuit are shown as being in different locations, but in the actual structure, both are stacked in one element area 4. The structures of the FET 5 and emitter array unit 6 are the same as in the first embodiment.

The first drive circuit B connected to the control wiring 12 latches the control signals that have been serially applied to the FET 5 in order to select the ON/OFF status of the FET switching elements 5, allowing the control signals of all the FETs 5 to be applied to the control wiring 12 at the desired timing. The drive circuit B in this embodiment is preferably formed of an element generally referred to as a shift register or latch/shift register. One bit of the shift register and the latch corresponds to each FET 5. The data in the circuit is synchronized to a clock (not shown), and is input from a serial input via a clock-synchronized type of serial interface. The data is transmitted up to the necessary bits of shift registers. The shift register data is then held by means of a latch in a latch circuit. The gates G of the FETs 5 are controlled according to the data held in the latch circuit. A fixed voltage-applying means 10 for applying a ground potential is connected to the data wiring 13 as the second drive circuit for applying a predetermined fixed potential. The structure of the third drive circuit C is the same as that in the first embodiment.

Figure 6:
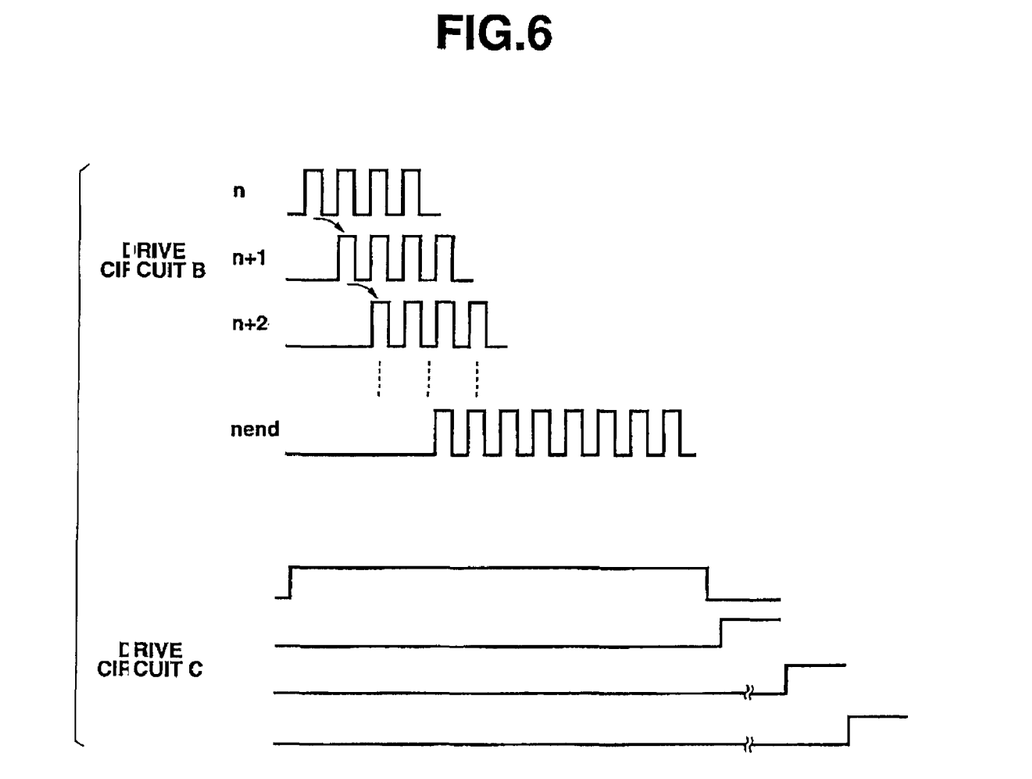
FIG. 6 is a drive timing chart for the electron-emissive element of FIG. 5.

The drive pattern according to the embodiment will be explained with reference to FIG. 6. In FIG. 6, time lapse in response to clock signals is shown from left to right. From the top to the bottom is shown, from among one bit of the shift register and the latch corresponding to each emitter array unit 6, signals n, n+1, n+2 to the final n-end signal. Serially input data is sequentially transmitted from n to n-end of a bit. When the transmission is complete, the shift register data is held by means of a latch in a latch circuit, and the gates G of the FETs 5 are controlled according to the data.

The fixed potential-applying means 10, which is the second drive circuit, is always at ground potential so that electrons can be emitted from the emitter arrays 7 to anodes for a light-emitting part of a display device (not shown) to which a predetermined positive potential has been applied.

While the control data is being supplied by the first drive electrode B to the emitter array units 6, the emitter array drive circuit C drives one of the four emitter array selection wirings 9 and continues to sequentially drive the other emitter array selection wirings 9 in synchronized timing with the drive of the first drive electrode B.

According to the electron-emissive element 1' in this embodiment, while the fixed potential-applying means 10 sets the sources S of the FETs 5 to ground potential, the first drive circuit B inputs control signals to the gates G of the FETs 5, so that emitter array units 6 can be selected, and emitter arrays 7 driven at the same time can be selected from among the emitter array units 6 by the emitter array drive circuit C. The duty ratio while the units are driven can thus be greater than when emitter arrays are selected in a matrix having a common structure of the type where the matrix is former by first and second wirings in the order of several hundred units each. The light-emitting time is also longer when the above are used as electron sources in a display device, resulting in better brightness. The potential of the fixed potential-applying means 10 can also De changed to adjust the level of electron emission from the emitter arrays 7. The shift register and the latch forming the first drive circuit B may be provided corresponding to each element area 4 on the monocrystalline Si substrate.

Figure 7:
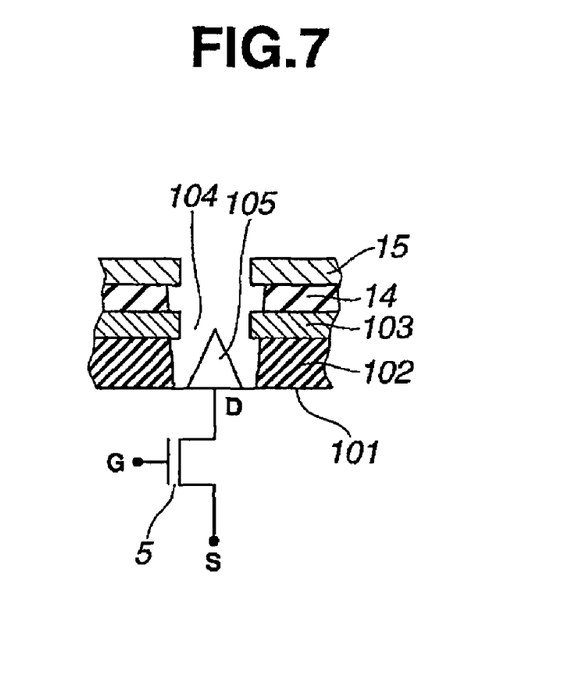
FIG. 7 is a fragmental sectional view of another embodiment of an electron-emissive element according to another aspect of the present invention.

In the embodiments described above, the gate electrodes 103 of emitter arrays 7 located in each emitter array unit 6 are connected in common to a plurality of emitter array selection wirings 9, and the plurality of emitter array selection wirings 9 are sequentially driven to select the emitter arrays 7. It is to be understood that the emitter arrays 7 can be selected by another structure. In the embodiment shown in FIG. 7, a switching electrode 15 is provided for each emitter array 7 of the emitter array units 6. The switching electrode 15 is provided via an insulation layer 14 on the gate electrode 103, and is also used as a focusing electrode for focusing the electron beam directed from the emitters 105 toward light-emitting anodes of a display device (not shown). The switching electrodes 15 arranged at the corresponding positions of each emitting array unit 6 are connected in common by a plurality of emitting array selection wirings 9, and the plurality of emitting array selection wirings 9 continue to be sequentially driven by the emitter array drive circuit. When the gate electrodes 103 are driven, a voltage of about 50 V must be applied to the gate electrodes 103 when the emitter potential is 0 V, and the voltage is switched. In the structure shown in FIG. 7, a constant voltage of 50 V is applied to the gate electrodes 103, and 0 V or −5 V is applied to the switching electrodes 15 to enable switching. In this embodiment, the switching voltage can be reduced to save energy consumption. In the embodiments explained hereinabove, the use of a Spindt-type emitter is shown. It is to be understood that the emitter is not limited to Spindt-type as cold cathode electron-emissive elements such is MIM (metal-insulator-metal) type, MIS (metal-insulator-semiconductor) type, and BSE (ballistic electron surface emitter) type can also be used.

In the first, second, and third embodiments explained hereinabove, a FET 5 is disposed as a switching element in each element area 4. However, it is to be understood that, two complementary types of FET composed of a P-channel FET and an N-channel FET may be disposed in the each element area. Furthermore, in the above embodiments, the electron-emissive elements 1, 1' are formed on silicon monocrystalline substrates. It is to be understood that the invention is not limited to the specific embodiments. The electron-emissive elements 1, 1' can be produced by well-known techniques using transistors and emitters to be stacked so as to form the emitters on circuits using TFT on glass substrates.

Figure 8:
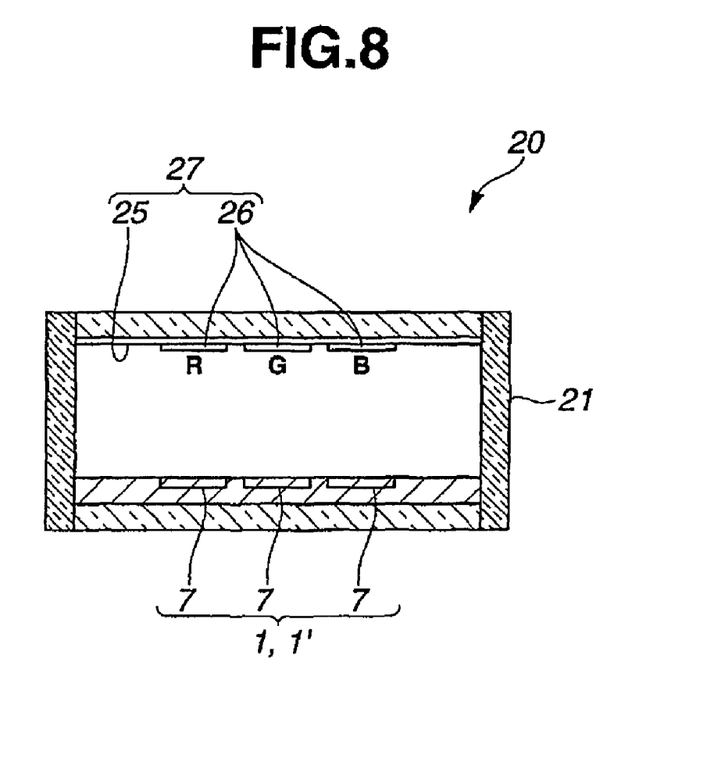
FIG. 8 is a cross sectional view of an embodiment of a display element incorporating the electron-emissive elements of FIGS. 1 and 5 as an electron source according to an aspect of the present invention.

FIG. 8 shows the fourth embodiment in which the electron-emissive elements 1 and 1' are mounted in an envelop 21 as an electron source of the display element for a fluorescent display tube 20. An anode 27 is formed as a Light-emitting display part formed by an anode electrode 25 and fluorescent layers 26 in an opposite relationship to the electron-emissive elements 1 and 1' in the envelop 21. The anode 27 may be solid in the case of monochromatic displays. In the case of full color displays, as shown in FIG. 8, display segments R, G, and B corresponding to the colors red, green, and blue may be provided, and the segments R, G, and B are constructed so as to correspond to the emitter arrays 7 of the field emission elements.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangements included within the spirit and scope of the invention, as set forth by the appended claims.

We claim:

1. An electron-emissive element, comprising:
a matrix wiring including first and second wirings for defining a plurality of element areas in a matrix to which predetermined potentials are applied, respectively;
switching circuits provided in each element area including switching elements connected to the matrix wiring;
emitter array units stacked on the switching circuits in each element area and connected to the switching circuits, said emitter array units including a plurality of emitter arrays having a plurality of microchip emitters for emitting electrons and a gate electrode for extracting the electrons from the microtip emitters; and
an emitter array drive circuit for driving the emitter array unit for each emitter array provided at the corresponding locations in each emitter array unit,
wherein the switching elements are driven by the matrix wiring to select the emitter array units, and the emitter arrays in the selected emitter array units are selected by the emitter array drive circuit.

2. The electron-emissive element according to claim 1, wherein the gate electrodes of the emitter arrays provided at the corresponding locations in each emitter array unit are connected in common by a plurality of emitter array selection wiring systems, and
the emitter array drive circuit drives the plurality of emitter array selection wirings.

3. The electron-emissive element according to claim 1, further comprising switching electrodes provided in each emitter array unit, wherein the switching electrodes corresponding to each emitter array unit are connected in common by the plurality of emitter array selection wirings, and wherein the emitter array drive circuit drives the plurality of emitter array selection wirings.

4. The electron-emissive element according to claim 2, wherein control terminals of the switching elements are connected by a first control wiring of the matrix wiring, one of the input terminal and output terminal of each switching element is connected to the emitter array unit, and the other of the input terminal and output terminal of each switching element is connected to a common fixed potential which is the second wiring of the matrix wiring, the electron-emissive element further comprising:
a first drive circuit for serially transmitting data is connected to the control wiring; and
a second drive circuit for applying a predetermined potential to the other of the input terminal and output terminal of each switching circuit is connected to the fixed potential,
wherein control signals are applied to the control terminal of each switching element during one drive cycle to select the emitter array units, and the emitter arrays in the drive cycle are selected by the emitter array drive circuit.

5. A display element, comprising:
a matrix wiring comprising a first and a second wirings for defining a plurality of element areas in a matrix and driven at a predetermined potential;
switching circuits provided in each element area including switching elements connected to the matrix wiring;
emitter array units stacked on the switching circuits in each element area and connected to the switching circuits, said emitter array units including a plurality of emitter arrays having a plurality of microtip emitters for emitting electrons and a gate electrode for extracting the electrons from the microtip emitters;
an emitter array drive circuit for driving the emitter array unit for each emitter array provided at the corresponding locations in each emitter array unit; and
anodes disposed opposite to the emitter array units having a certain distance from the emitter array units and a fluorescent material for emitting light upon being bombarded with electrons emitted from the emitters,
wherein the switching elements are driven by the matrix wiring to select the emitter array units, the emitter arrays in the selected emitter array units are selected by the emitter array drive circuit, and the electrons emitted from the emitters in the selected emitter arrays bombard the fluorescent material of the anode, thereby emitting light.

* * * * *

UNITED STATES PATENT AND TRADEMARK OFFICE
CERTIFICATE OF CORRECTION

PATENT NO. : 8,044,596 B2
APPLICATION NO. : 12/252359
DATED : October 25, 2011
INVENTOR(S) : Masateru Taniguchi et al.

It is certified that error appears in the above-identified patent and that said Letters Patent is hereby corrected as shown below:

Column 1, Line 20 "election-emissive" should be changed to -- electron-emissive --
Column 1, Line 40 "elect-on-emissive" should be changed to -- electron-emissive --
Column 3, Line 15 "election" should be changed to -- electron --
Column 4, Line 34 "FET" should be changed to -- FETs --
Column 5, Line 4 "slacked" should be changed to -- stacked --
Column 6, Line 51 "sources S" should be changed to -- source S --
Column 7, Line 3 "gate Ls generally" should be changed to -- gate is generally --
Column 7, line 64 "driver" should be changed to -- driven --
Column 7, line 65 "elections" should be changed to -- electrons --
Column 8, line 60 "elections" should be changed to -- electrons --
Column 8, line 65 "election" should be changed to -- electrons --
Column 10, line 9 "former" should be changed to -- formed --
Column 10, Line 13 "De" should be changed to -- be --
Column 10, Line 46 "is" should be changed to -- as --
Column 11, line 26 "microchip" should be changed to -- microtip --

Signed and Sealed this
Third Day of January, 2012

David J. Kappos
*Director of the United States Patent and Trademark Office*